(12) United States Patent
Blake (10) Patent No.: US 10,185,757 B2
(45) Date of Patent: Jan. 22, 2019

(54) NON-UNIFORM MULTI-ROW TEXT FILE LOADING

(71) Applicant: DataIQ,LLC, Dublin, OH (US)

(72) Inventor: Frederick G. Blake, Dublin, OH (US)

(73) Assignee: DATAIQ, LLC, Dublin, OH (US)

( * ) Notice: Subject to any disclaimer, the term of this patent is extended or adjusted under 35 U.S.C. 154(b) by 487 days.

(21) Appl. No.: 14/922,444

(22) Filed: Oct. 26, 2015

(65) Prior Publication Data

US 2017/0116208 A1 Apr. 27, 2017

(51) Int. Cl.
*G06F 17/30* (2006.01)
(52) U.S. Cl.
CPC .............. *G06F 17/30557* (2013.01)
(58) Field of Classification Search
CPC .................................. G06F 17/30557
See application file for complete search history.

(56) References Cited

U.S. PATENT DOCUMENTS

| 2003/0055835 | A1* | 3/2003 | Roth | G06F 19/28 |
| 2006/0112133 | A1* | 5/2006 | Ljubicich | G06F 17/30958 |
| 2014/0164408 | A1* | 6/2014 | Dubbels | G06F 17/2705 |
| | | | | 707/755 |
| 2015/0186668 | A1* | 7/2015 | Whaley | G06F 21/6218 |
| | | | | 713/156 |

* cited by examiner

*Primary Examiner* — Mark D Featherstone
*Assistant Examiner* — Tony Wu
(74) *Attorney, Agent, or Firm* — Cooper Legal Group, LLC (57) ABSTRACT

One or more techniques and/or systems are provided for metadata driven loading a non-uniform multi-row text file. A non-uniform multi-row text file may comprise one or more disparate rows, such as a first row with a name field, an address field, and an age field and a second row with an occupation field, a marital status field, and a gender field. The non-uniform multi-row text file may be evaluated by generating task execution code for tasks identified within a profile for a file type of the non-uniform multi-row text file (e.g., dynamically generate structure query language commands may be executed based upon the task execution code). Responsive to processing the task list, parsed output data for the non-uniform multi-row text file may be generated based upon result data for the tasks. The parsed output data may be outputted into a staging area, such as a staging table, for client access.

19 Claims, 8 Drawing Sheets

MS_20150312_0945.NEW — 204a

| | | | | |
|---|---|---|---|---|
| JOE | SMITH | 910 FIRST STREET | 44303 | x |
| DOCTOR | MALE | SINGLE | 32 | a |
| SAM | SMITH | 9 WEST STREET | 42031 | x |
| SALES | FEMALE | MARRIED | 43 | a |
| ... | ... | ... | ... | |

250 → (row 1)
252 → (row 2)
254 → (row 3)
256 → (row 4)

NON-UNIFORM MULTI-ROW TEXT FILE LOADING

BACKGROUND

Many companies may receive external data from clients in the form of ASCII text files. Because clients may specify data in different formats through such text files, a company may spend time and resources creating customized applications and programming code for parsing, extracting, and loading data from text files in different formats. For example, a first client may specify account records where respective rows correspond to a first name, a last name, an address, and an account number, while a second client may specify account records where respective rows correspond to a full name, an address, an age, and an account number. These text files may have rows that adhere to the same established norm where each row has the same fields in the same order with the same attributes as other rows (e.g., a uniform row text file). Unfortunately, development time and resources may be increased for loading text files that are non-uniform multi-row text files because an application may not natively understand how to parse such types of files because not every row has the same fields, order and/or attributes as other rows. Thus, a custom application may need to be created with custom and complex methods for loading a single type of non-uniform multi-row text file. If different types of non-uniform multi-row text files are to be loaded, then extensive amount of time and resources would be devoted for customizing code for loading each type.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

Among other things, one or more systems and/or techniques for loading non-uniform multi-row text files is provided herein. A non-uniform multi-row text file may be received (e.g., an auto dealer may provide inventor data to an online auto exchange website). The non-uniform multi-row text file may comprise a first row with data formatted according to a first format (e.g., a row comprising a car model field, a car manufacturer field, a year field, a color field, and an owner field), a second row with data formatted according to a second format (e.g., a row comprising a motorcycle model field, a year field, a vehicle identification number field, and a motorcycle manufacturer field), and/or other rows with similar or different formats. A profile for the non-uniform multi-row text file may be identified (e.g., metadata describing the non-uniform multi-row text file and/or a file type of the non-uniform multi-row text file such as an add inventory file type may be used to identify the profile; the profile may be dynamically generated based upon the metadata and/or the file type; etc.). The profile may comprise metadata (e.g., a provider of the non-uniform multi-row text file may specify what fields, field order, and/or attributes are to be expected on particular rows of the non-uniform multi-row text file) describing a set of tasks used to load a file type of the non-uniform multi-row text file. The profile may be evaluated to generate a task list based upon the set of tasks.

Tasks within the task list may be executed to extract, calculate, normalize, or update data from the non-uniform multi-row text file. For each task within the task list, task execution code may be generated. The task execution code may be executed upon the non-uniform multi-row text file to generate result data for the task. Responsive to processing the task list, parsed output data for the non-uniform multi-row text file may be generated based upon result data for the tasks. The parsed output data may correspond to data extracted from fields within the non-uniform multi-row text file. The parsed output data may be outputted to a single staging area for client access (e.g., a staging table with a static structure regardless of any text file load that is to add a new staging field(s)), such as for population into a database or other use.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

The claimed subject matter is now described with reference to the drawings, wherein like reference numerals are generally used to refer to like elements throughout. In the following description, for purposes of explanation, numerous specific details are set forth to provide an understanding of the claimed subject matter. It may be evident, however, that the claimed subject matter may be practiced without these specific details. In other instances, structures and devices are illustrated in block diagram form in order to facilitate describing the claimed subject matter.

A company may receive and process disparate text files having data specified according to different formats (e.g., different numbers of fields, data types, field orders, attributes, etc.). Development of applications to parse, extract, and load data from such text files may become complex and customized when such text files correspond to non-uniform multi-row text files where not all rows within a text file comprise the same data format (e.g., a row may have 3 fields corresponding to first name, last name, and age, while a different row may have 2 fields corresponding to address and gender). Thus, extensive amounts of time and resources may be devoted to creating customized applications for parsing different types of non-uniform multi-row text files.

Accordingly, as provided herein, various types of non-uniform multi-row text files may be loaded using a metadata driven process, such as where a single loading application may be used to load various types of non-uniform multi-row text files with little to no custom code modification. A load technique for disparate non-uniform multi-row text files may be distilled down into discrete sequential components (e.g., task execution code may be dynamically generated for a task defined by metadata within a profile for a file type of a non-uniform multi-row text file) where attributes of each component comprise information used to perform a specific load process task. In this way, a single loading application may dynamically retrieve and reconstitute metadata into task execution code used to load different types of non-uniform multi-row text files without custom programming code and/or code modification.

The loading technique may map source values, of disparate non-uniform multi-row text files from various clients, to normalized standard values without custom programming code and/or code modifications. Because the loading technique is metadata driven (e.g., a client that provided the non-uniform multi-row text file may provide metadata describing what fields, field ordering, and/or data types to expect on particular rows, which may be consumed by the loading technique without additional custom coding), time and/or resources otherwise devoted to modifying code of a load application for processing a particular non-uniform multi-row text file may be saved. The parsed output data may be loaded into a single staging area, such as a staging table, regardless of a layout of a source non-uniform multi-row text file, and thus the stage table's schema may be static.

The loading technique may process text files having a record management service (RMS) format, an AIM format (e.g., a proprietary file save/export format generated by an AIM Latitude application), a CACS format (e.g., a proprietary file save/export format generated by CACS application), a NAN format, a YGC format (e.g., a proprietary file save/export format generated by YGC application), and/or other formats. The loading technique may process dollar values with or without implied decimals and/or represented as IBM signed numbers without custom coding. The loading technique may report out fields having values that are incompatible with expected data types. The loading technique may be self-documenting because the loading technique is metadata driven. In this way, a single loading application and/or staging table format may be used to process various types of non-uniform multi-row text files without code modification, which may significantly reduce processing resources otherwise used for customizing loading applications.

Figure 1:
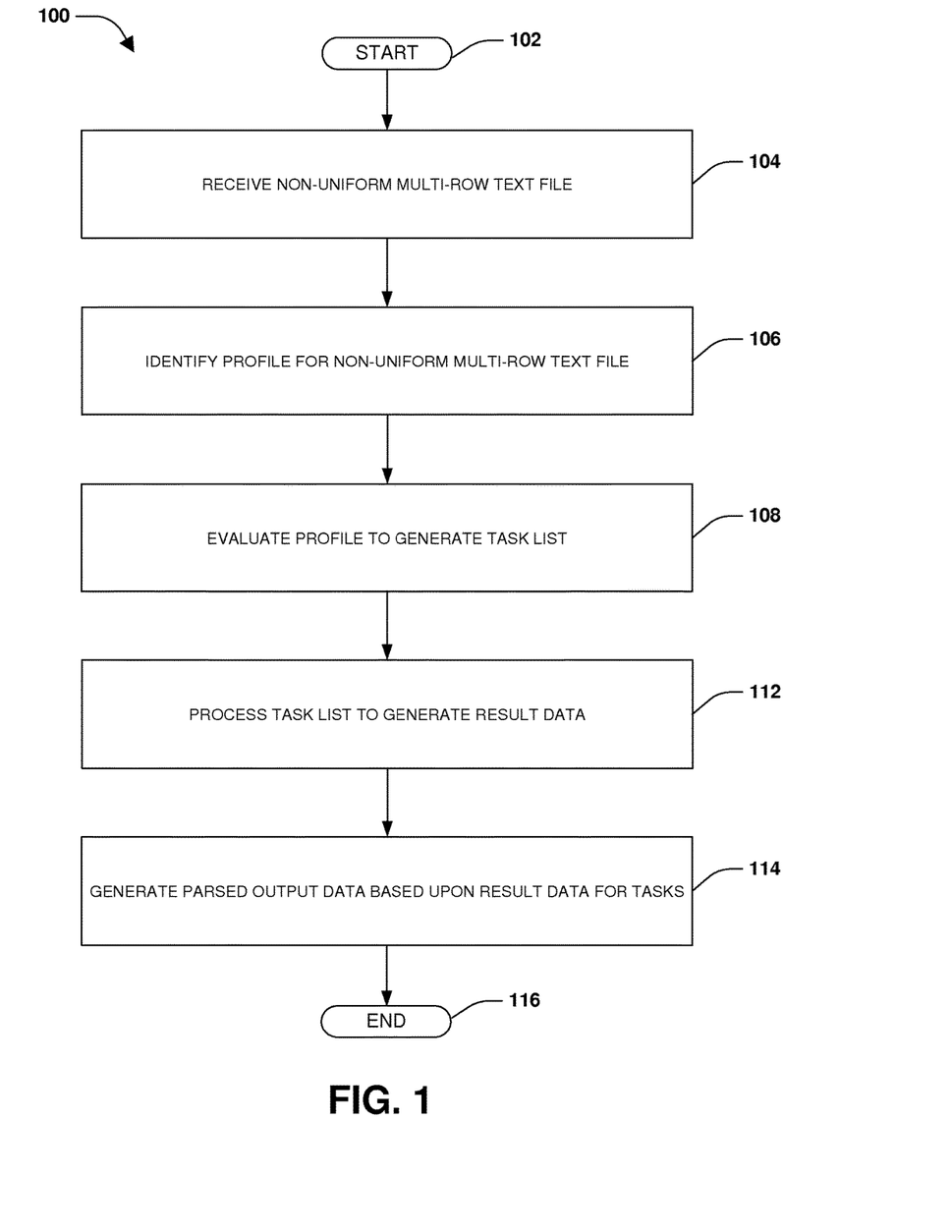
FIG. 1 is a flow diagram illustrating an exemplary method of loading non-uniform multi-row text files.

An embodiment of loading a non-uniform multi-row text file is illustrated by an exemplary method 100 of FIG. 1. At 102, the method 100 starts. At 104, a non-uniform multi-row text file may be received. For example, an auto dealer may provide a vehicle text file to an online auto trading website for processing. The non-uniform multi-row text file may comprise a first row with data formatted according to a first format such as 4 fields relating to car data, a second row with data formatted according to a second format such as 4 fields relating to ownership data, and/or other rows with other data formats. Thus, not all rows within the non-uniform multi-row text file have the same data format, such as fields, ordering, data types, and/or other attributes. In an example, the non-uniform multi-row text file may be renamed based upon a source that provided the non-uniform multi-row text file (e.g., an abbreviation or identifier for the auto dealer), timestamp information, and a file type (e.g., a file type used to update existing records, a file type used to add new records, a file type used to delete records, etc.) to create a renamed non-uniform multi-row text file. In an example, metadata, describing what fields, ordering of fields, data types, and/or other attributes are to be expected for each row of the non-uniform multi-row text file, may be received with the non-uniform multi-row text file.

At 106, a profile for the non-uniform multi-row text file may be identified. The profile may comprise metadata defining a set of sequential tasks used to load the file type of the non-uniform multi-row text file. The profile and associated tasks may correspond to an object model structured with the necessary attribute values needed to dynamically generate code for each task at runtime.

At 108, the profile may be evaluated to generate a task list based upon the set of tasks. In an example, a task corresponds to a user defined formula, a user defined calculation, a user defined constant, a user defined conditional statement, etc. (e.g., a formula to calculation commission as: Commission=Balance*0.0250). In another example, the task corresponds to a user mapping of an original value to a user predefined value (e.g., OH→OHIO). In another example, the task may correspond to a procedure to perform a routine that could not be implemented using metadata (e.g., a custom or generic procedure to perform a routine such as parsing a name, removing duplicates rows, etc.). In another example, the task may correspond to a user mapping from a source field of the non-uniform multi-row text file to a destination field within a staging area within which the parsed output data is to be outputted (e.g., a mapping: Client Account No→account_ID; a mapping: Middle Initial→MI; etc.). In another example, the task may correspond to an extraction of data from the non-uniform multi-row text file for processing a subsequent non-uniform multi-row text file.

At 112, respective tasks within the task list are processed. For example, task execution code for a task may be generated. The task execution code may correspond to dynamically generated code, structured query language command (e.g., a T-SQL statement), etc. In this way, the task execution code may be executed upon the non-uniform multi-row text file to generate result data for the task (e.g., the task and/or other tasks may be executed to extract data from one or more fields and/or rows of the non-uniform multi-row text file). If a data field within the non-uniform multi-row text file does not correspond to an expected data type, the data field may be excluded from parsed output data or may be replaced with a placeholder value. At 116, responsive to processing the task list, parsed output data may be generated for the non-uniform multi-row text file based upon result data for the tasks. The parsed output data may be outputted into a staging area (e.g., a staging table) that is exposed for client access (e.g., a client may access car data, ownership data, and/or other data that was parsed, extracted, and cleaned from the non-uniform multi-row text file).

In an example, multiple non-uniform multi-row text files may be received and processed to populate the staging area (e.g., the staging table may have a static schema that does not need to be changed for various data formats and/or file types of disparate non-uniform multi-row text files, such as non-uniform multi-row text files having different numbers and/or types of fields on various rows). A set of non-uniform multi-row text files may be received. The set of non-uniform multi-row text files may be renamed based upon sources that provided the set of non-uniform multi-row text files, timestamp information, and/or file types to create a set of renamed non-uniform multi-row text files. The set of renamed non-uniform multi-row text files may be stored within a location, such as a network folder accessible to a load process.

The load process may be initiated to retrieve one or more renamed non-uniform multi-row text files from the network folder based upon a path-to-file parameter (e.g., a query used to retrieve renamed non-uniform multi-row text files having names that satisfy the query). In an example, the path-to-file parameter may comprise a wildcard character (e.g., *.*) used to filter or include renamed non-uniform multi-row text files. For respective renamed non-uniform multi-row text files of the one or more non-uniform multi-row text files, a target profile for a renamed non-uniform multi-row text file may be identified. The target profile may be evaluated to generate a target task list. For respective target tasks within the target task list, target task execution code is generated for a target task. The target task execution code may be executed upon the renamed non-uniform multi-row text file to generate target result data for the target task. Responsive to processing the target task list, target parsed output data for the renamed non-uniform multi-row text file may be generated based upon target result data for the target tasks. The target parsed output data may be loaded into a staging area, such as a staging table, for client access. In an example the staging area may provide access to parsed output data from a first renamed non-uniform multi-row text file having a first data format (e.g., rows with 3 fields) and a second renamed non-uniform multi-row text file having a second data format (e.g., rows with 5 fields). At 116, the method 100 ends.

Figure 2A:
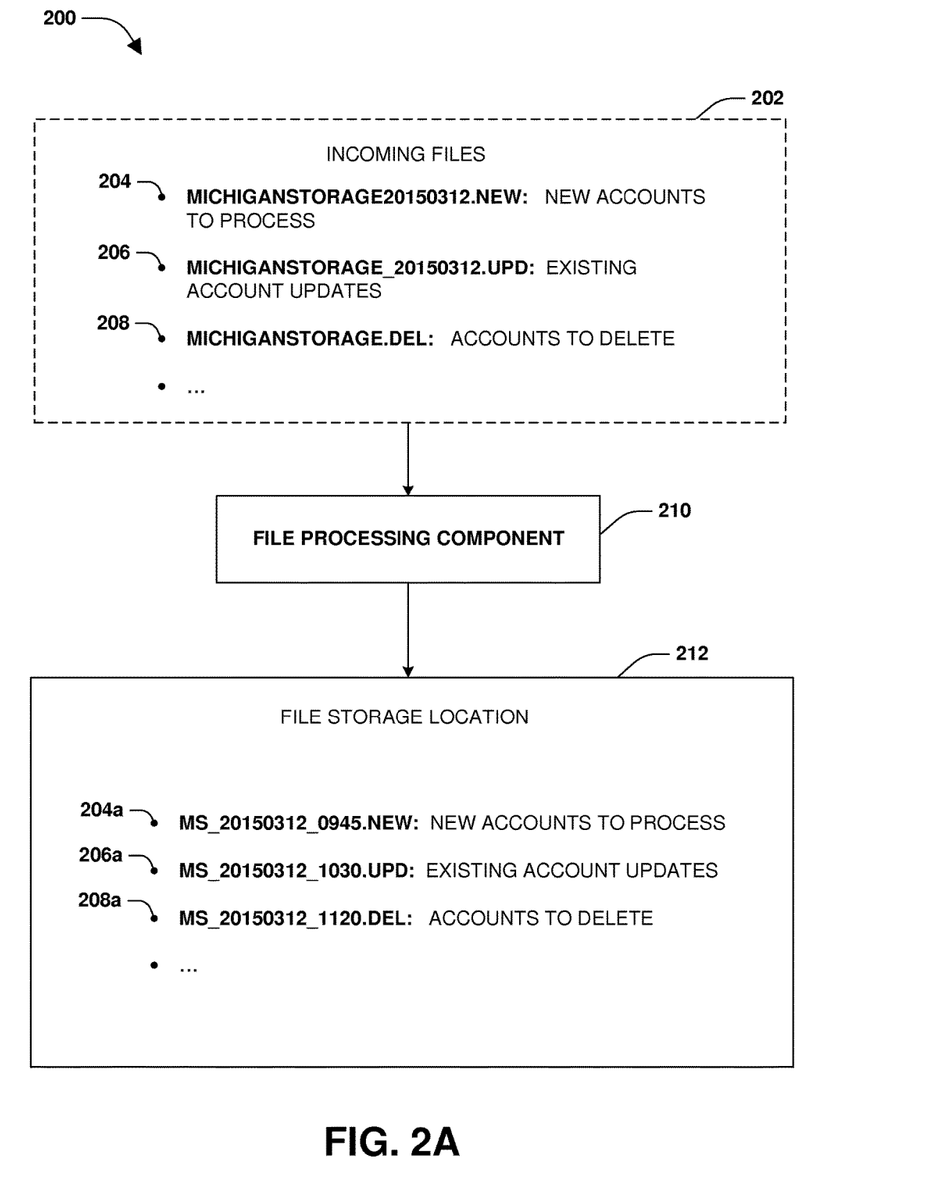
FIG. 2A is a component block diagram illustrating an exemplary system for of loading non-uniform multi-row text files.
Figure 2B:
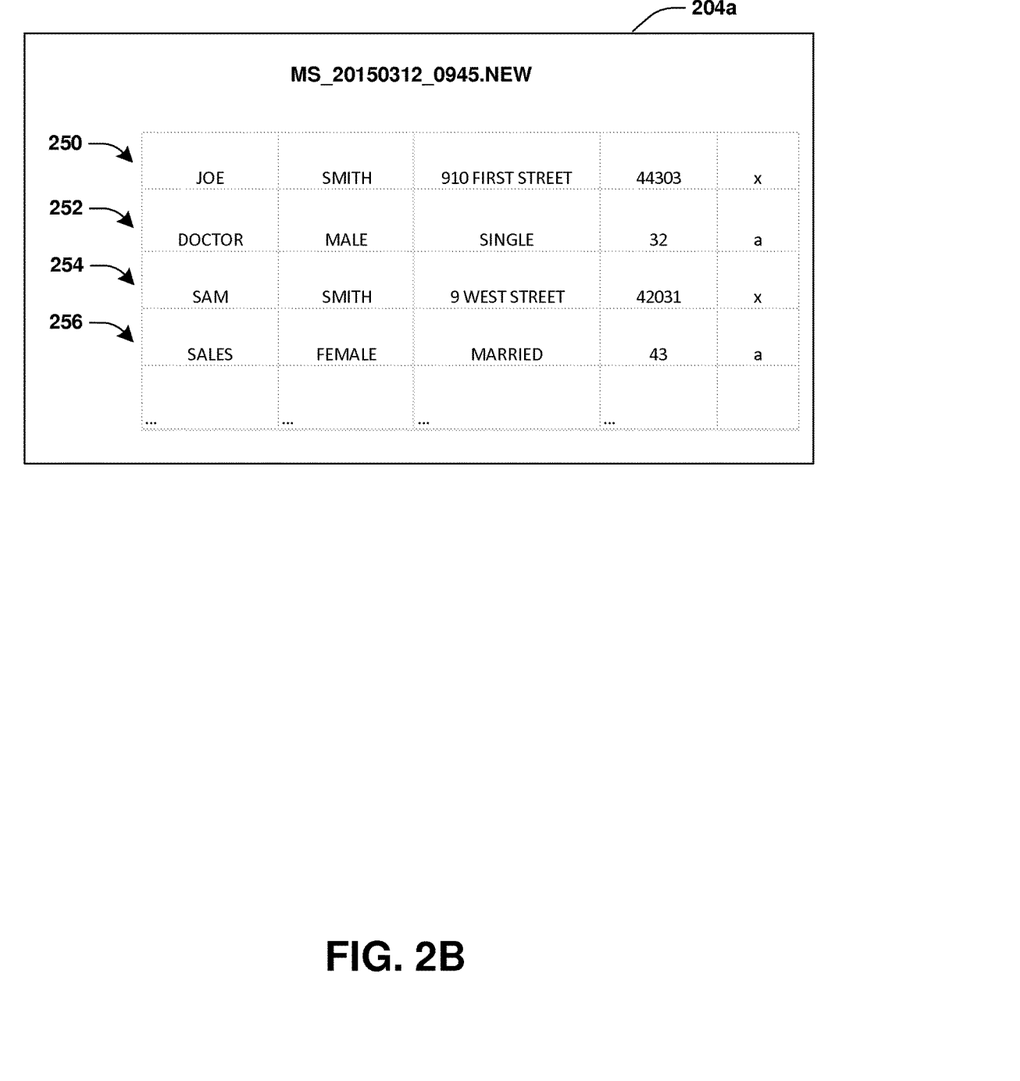
FIG. 2B illustrates an example of a non-uniform multi-row text file.

FIGS. 2A-2B illustrate examples of a system 200 for loading a non-uniform multi-row text file. FIG. 2A illustrates the system 200 comprising a file processing component 210. The file processing component 210 is configured to receive one or more incoming non-uniform multi-row text files 202 from a client. For example, the client may provide a new accounts file 204, an update accounts file 206, a delete accounts file 208, and/or other non-uniform multi-row text files. The file processing component 210 may rename the one or more incoming non-uniform multi-row text files 202 based upon a source that provided the incoming non-uniform multi-row text files 202 (e.g., an identifier "MS" may be used to designate the incoming non-uniform multi-row text files 202 as coming from a Michigan Storage company), timestamp information (e.g., a date and time represented by "20150312_0945"), and/or a file type (e.g., create new accounts ".NEW", update existing accounts ".UPD", delete current accounts ".DEL", etc.) to create a renamed new accounts file 204a, a renamed update accounts file 206a, and a renamed delete accounts file 208a, which may be stored within a file storage location 212.

FIG. 2B illustrates an example of one or more rows within the renamed new accounts file 204a. The renamed new accounts file 204a may comprise a first row 250, a second row 252, a third row 254, a fourth row 256, and/or other rows not illustrated. The first row 250 may be formatted according to a first format 250, such that the first row 250 comprises a first name field populated with "Joe", a last name field populated with "Smith", an address field populated with "910 First Street", a zip code field populated with "44303", and a row identifier field populated with an "x" to identify what type of fields, ordering of fields, and/or attributes are to be expected on the first row 250. The second row 252 may be formatted according to a second format, such that the second row 252 comprises an occupation field populated with "Doctor", a gender field populated with "Male", a marital status field populated with "Single", an age field populated with "32", and a row identifier field populated with an "a" to identify what type of fields, ordering of fields, and/or attributes are to be expected on the second row 252. The third row 254 may be formatted according to the first format, and thus may be populated with a row identifier field populated with the "x". The fourth row 256 may be formatted according to the second format, and thus may be populated with a row identifier field populated with the "a".

Figure 3A:
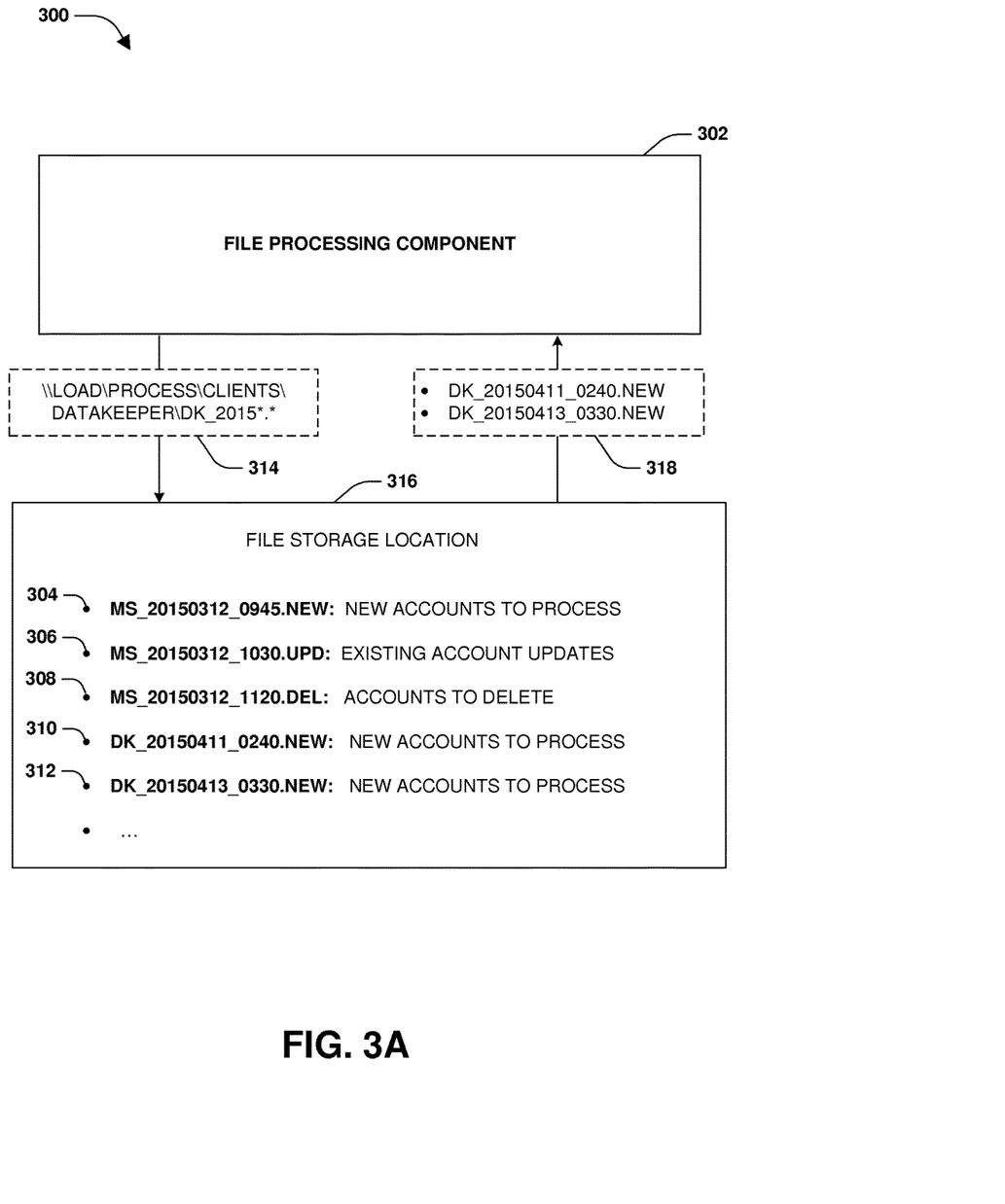
FIG. 3A is a component block diagram illustrating an exemplary system for of loading non-uniform multi-row text files, where one or more non-uniform multi-row text files are retrieved from a file storage location.
Figure 3B:
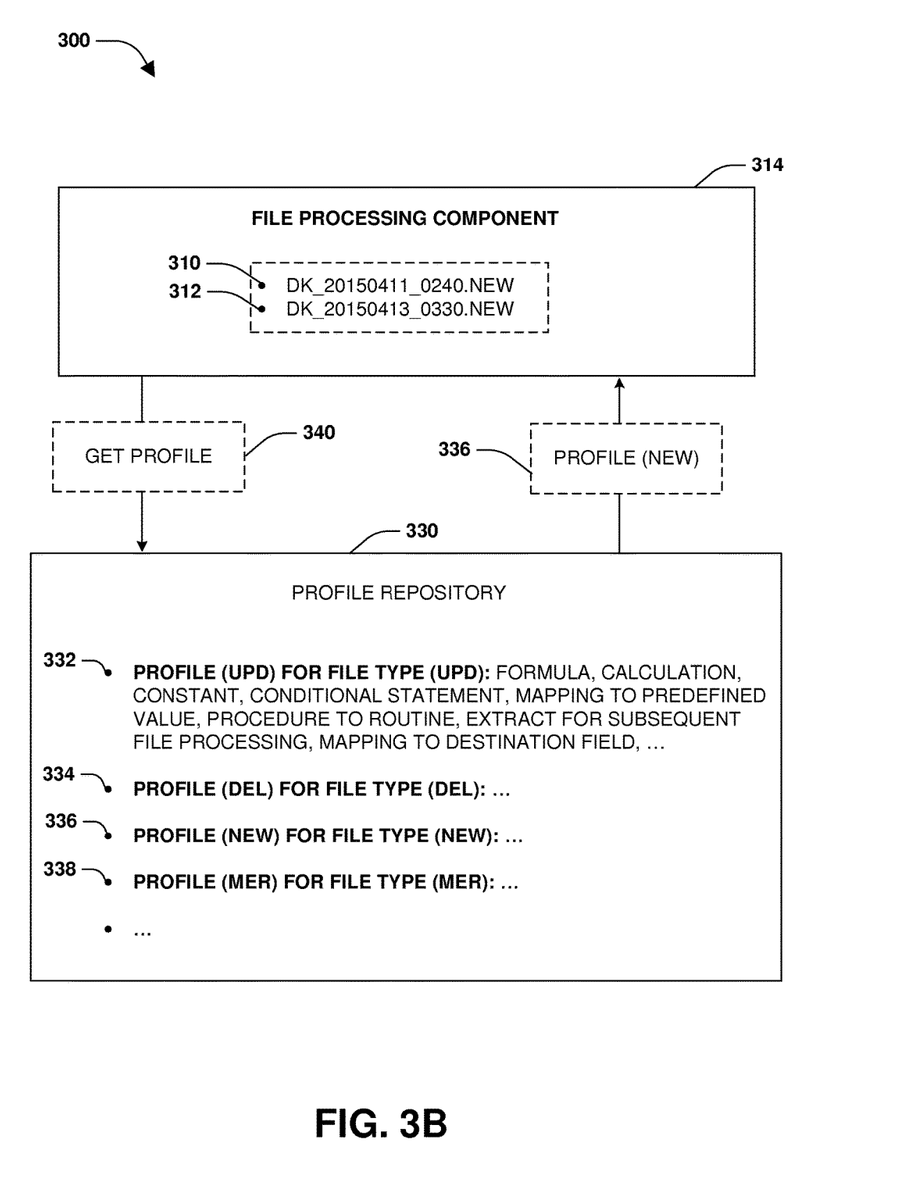
FIG. 3B is a component block diagram illustrating an exemplary system for of loading non-uniform multi-row text files, where a profile is identified.
Figure 3C:
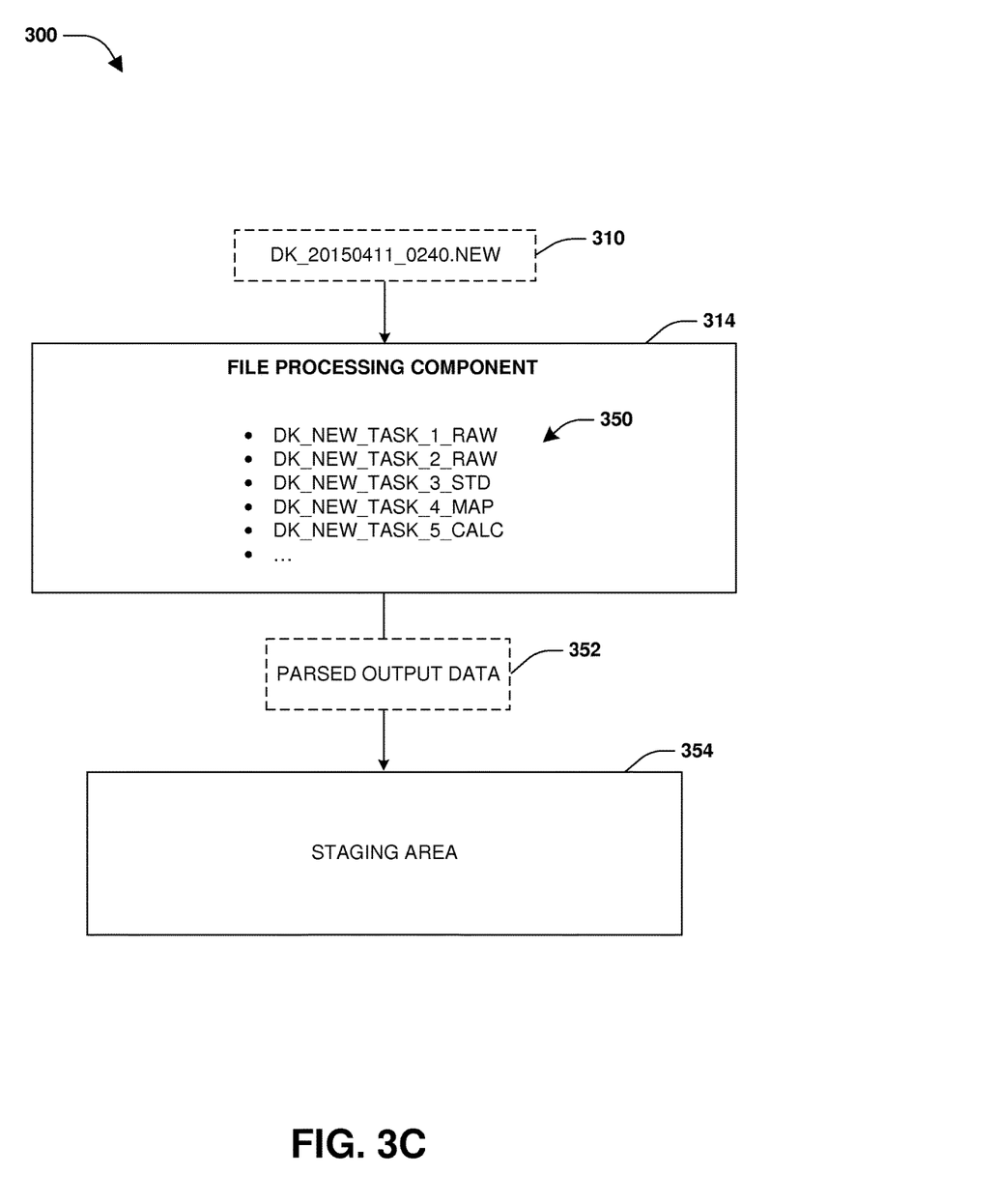
FIG. 3C is a component block diagram illustrating an exemplary system for of loading non-uniform multi-row text files, where a non-uniform multi-row text file is processed.

FIGS. 3A-3C illustrate examples of a system 300, comprising a file processing component 302, for loading a non-uniform multi-row text file. FIG. 3A illustrates a file storage location 316 comprising one or more non-uniform multi-row text files, such as a first file 304 for creating new accounts for a Michigan Storage company, a second file 306 to update existing accounts of the Michigan Storage company, a third file 308 for deleting accounts of the Michigan Storage company, a fourth file 310 for adding new accounts for a Data Keeper company, a fifth file 312 for adding new accounts for the Data Keeper company, etc. The file processing component 302 may query the file storage location 316 using a path-to-file parameter 314 to retrieve 318 one or more non-uniform multi-row text files satisfying the path-to-file parameter 314. For example, the fourth file 310 and the fifth file 312 may be retrieved 318 based upon the fourth file 310 and the fifth file 312 comprising names that satisfy the path-to-file parameter 314 of "\\load\process\clients\datakeeper\dk_2105*.*", where *.* is used as a wildcard.

FIG. 3B illustrates the file processing component 314 identifying 340 profiles corresponding to the fourth file 310 and the fifth file 312. A profile repository 330 may comprise profiles corresponding to different file types (e.g., an add new accounts file type, a delete accounts file type, and/or other attributes or metadata that may correspond to how data is formatted within a non-uniform multi-row text file) and/or sources (e.g., clients that provided files for loading). For example, a profile (UPD) 332 for a file type (UPD) may comprise user defined formulas, calculations, constants, conditional statements, mappings to predefined values, procedure to routine mappings, extractions of data for subsequent non-uniform multi-row text file processing, mappings to destination fields within a staging area, and/or other metadata that is dynamically transformable at runtime into task execution code for parsing, evaluating, and extract data from fields within disparate rows of files having the file type (UPD), such as files for updating existing client accounts.

In an example, the file processing component 314 may utilize a file type of the fourth file 310 and/or the fifth file 312 (e.g., a file type (NEW) corresponding to an add new accounts file type) and/or client supplied metadata describing how data is formatted within the fourth file 310 and/or the fifth file 312 to query the profile repository 330 to identify a profile (NEW) 336 as comprising metadata describing a set of tasks used to load files having the file type (NEW) for adding new accounts. In an example, the file processing component may identify the profile (NEW) 336 based upon a source (e.g., a client that provided the fourth file 310 and/or the fifth file 312) and the file type.

FIG. 3C illustrates the file processing component 314 sequentially processing a set of tasks 350, derived from the profile (NEW) 336, for extracting parsed output data 352 from the fourth file 310. For example, the profile (NEW) 336 may comprise metadata of a first task (e.g., a RAW task to prep raw data for later processing), which may be used to dynamically generate first task execution code for the first task. The dynamically generated first task execution code may be executed upon the fourth file 310 to generate first result data. The profile (NEW) 336 may comprise metadata of a second task, which may be used to dynamically generate second task execution code for the second task. The dynamically generated second task execution code may be executed upon the fourth file 310 to generate second result data. In this way, tasks within the task list 350 may be performed to generate result data used to generate parsed output data 352 for the fourth file 310 (e.g., an STD task that parses and formats data, such as by mapping a client account number from a source file, such as the fourth file 310, to an account number in a staging area 354; a MAP task that normalizes a value to a normalized value/format, such as mapping OH to OHIO; a CALC task for calculating a value, such as a formula to calculate a commission rate; a PROC task for performing a procedure; etc.). The parsed output data 352 may be outputted into the staging area 354 for client access. Similarly, parsed output data may be generated for the fifth file 312, and outputting into the staging area 354.

Figure 4:
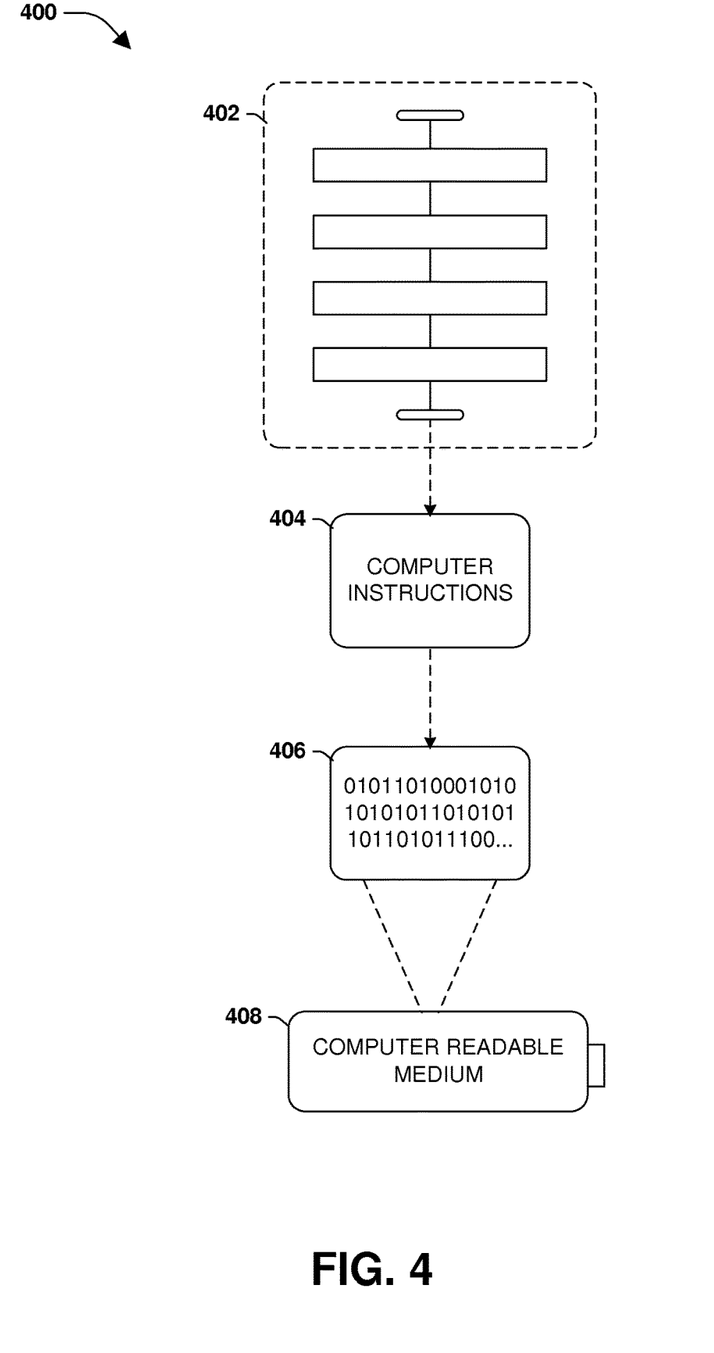
FIG. 4 is an illustration of an exemplary computer readable medium wherein processor-executable instructions configured to embody one or more of the provisions set forth herein may be comprised.

Still another embodiment involves a computer-readable medium comprising processor-executable instructions configured to implement one or more of the techniques presented herein. An example embodiment of a computer-readable medium or a computer-readable device is illustrated in FIG. 4, wherein the implementation 400 comprises a computer-readable medium 408, such as a CD-R, DVD-R, flash drive, a platter of a hard disk drive, etc., on which is encoded computer-readable data 406. This computer-readable data 406, such as binary data comprising at least one of a zero or a one, in turn comprises a set of computer instructions 404 configured to operate according to one or more of the principles set forth herein. In some embodiments, the set of computer instructions 404 are configured to perform a method 402, such as at least some of the exemplary method 100 of FIG. 1, for example. In some embodiments, the set of computer instructions 404 are configured to implement a system, such as at least some of the exemplary system 200 of FIGS. 2A-2B and/or at least some of the exemplary system 300 of FIGS. 3A-3C, for example. Many such computer-readable media are devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

As used in this application, the terms "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 5:
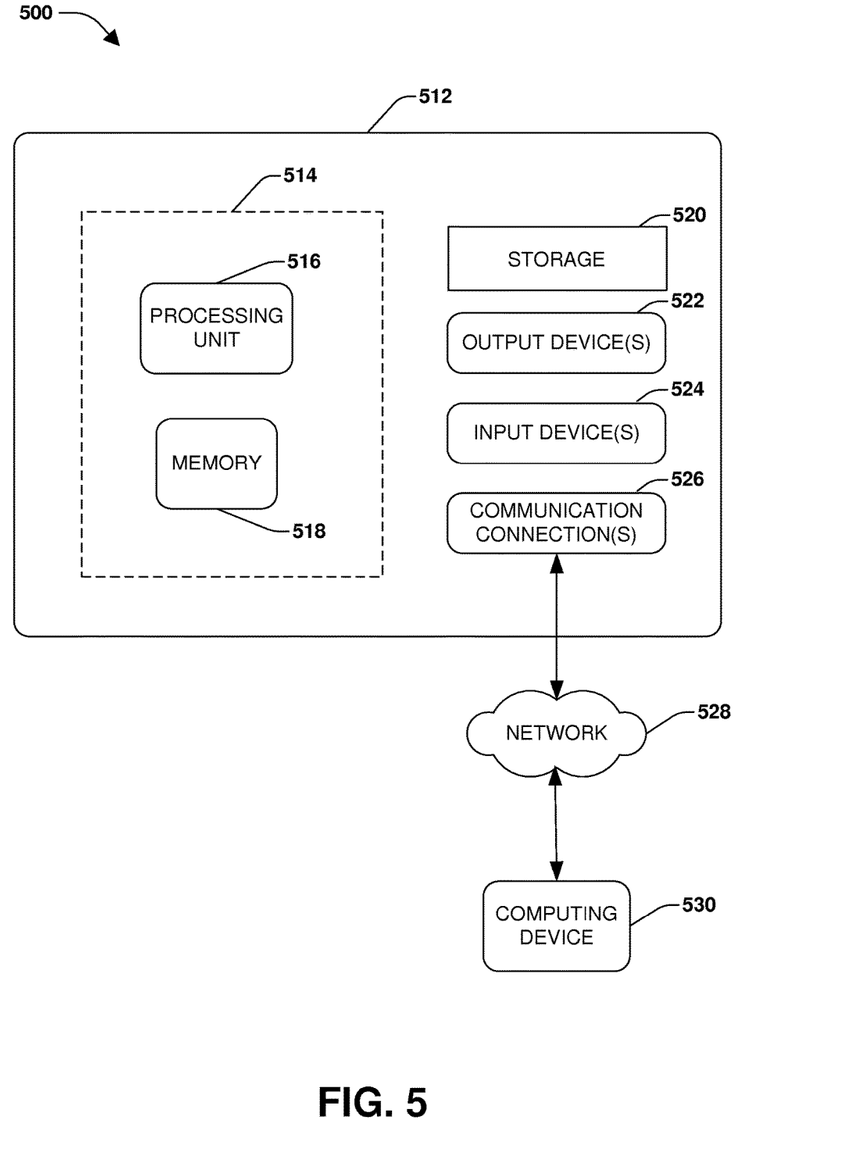
FIG. 5 illustrates an exemplary computing environment wherein one or more of the provisions set forth herein may be implemented.

FIG. 5 and the following discussion provide a brief, general description of a suitable computing environment to implement embodiments of one or more of the provisions set forth herein. The operating environment of FIG. 5 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 5 illustrates an example of a system 500 comprising a computing device 512 configured to implement one or more embodiments provided herein. In one configuration, computing device 512 includes at least one processing unit 516 and memory 518. Depending on the exact configuration and type of computing device, memory 518 may be volatile (such as RAM, for example), non-volatile (such as ROM, flash memory, etc., for example) or some combination of the two. This configuration is illustrated in FIG. 5 by dashed line 514.

In other embodiments, device 512 may include additional features and/or functionality. For example, device 512 may also include additional storage (e.g., removable and/or non-removable) including, but not limited to, magnetic storage, optical storage, and the like. Such additional storage is illustrated in FIG. 5 by storage 520. In one embodiment, computer readable instructions to implement one or more embodiments provided herein may be in storage 520. Storage 520 may also store other computer readable instructions to implement an operating system, an application program, and the like. Computer readable instructions may be loaded in memory 518 for execution by processing unit 516, for example.

The term "computer readable media" as used herein includes computer storage media. Computer storage media includes volatile and nonvolatile, removable and non-removable media implemented in any method or technology for storage of information such as computer readable instructions or other data. Memory 518 and storage 520 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 512. Computer storage media does not, however, include propagated signals. Rather, computer storage media excludes propagated signals. Any such computer storage media may be part of device 512.

Device 512 may also include communication connection(s) 526 that allows device 512 to communicate with other devices. Communication connection(s) 526 may include, but is not limited to, a modem, a Network Interface Card (NIC), an integrated network interface, a radio frequency transmitter/receiver, an infrared port, a USB connection, or other interfaces for connecting computing device 512 to other computing devices. Communication connection(s) 526 may include a wired connection or a wireless connection. Communication connection(s) 526 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 512 may include input device(s) 524 such as keyboard, mouse, pen, voice input device, touch input device, infrared cameras, video input devices, and/or any other input device. Output device(s) 522 such as one or more displays, speakers, printers, and/or any other output device may also be included in device 512. Input device(s) 524 and output device(s) 522 may be connected to device 512 via a wired connection, wireless connection, or any combination thereof. In one embodiment, an input device or an output device from another computing device may be used as input device(s) 524 or output device(s) 522 for computing device 512.

Components of computing device 512 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 512 may be interconnected by a network. For example, memory 518 may be comprised of multiple physical memory units located in different physical locations interconnected by a network.

Those skilled in the art will realize that storage devices utilized to store computer readable instructions may be distributed across a network. For example, a computing device 530 accessible via a network 528 may store computer readable instructions to implement one or more embodiments provided herein. Computing device 512 may access computing device 530 and download a part or all of the computer readable instructions for execution. Alternatively, computing device 512 may download pieces of the computer readable instructions, as needed, or some instructions may be executed at computing device 512 and some at computing device 530.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Further, unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "exemplary" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", and/or variants thereof are used in either the detailed description or the claims, such terms are intended to be inclusive in a manner similar to the term "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method for loading a non-uniform multi-row text file, comprising:
   receiving a non-uniform multi-row text file comprising a first row with data formatted according to a first format and a second row with data formatted according to a second format different than the first format, renaming the non-uniform multi-row text file based upon a source that provided the non-uniform multi-row text file, timestamp information, and a file type to create a renamed non-uniform multi-row text file;
   identifying a profile for the non-uniform multi-row text file, the profile comprising metadata describing a set of tasks used to load a file type of the non-uniform multi-row text file, wherein the profile is selected from a set of profiles, used by a loading technique for processing record management service (RMS) format files, Latitude (AIM) format files, CACS format files, (NAN) format files, and YGC format files, based upon the first data format and the second data format;
evaluating the profile to generate a task list based upon the set of tasks, wherein the evaluating comprises:
parsing the profile to identify a first description of fields, field order, and field attributes that are expected for the first row and a second description of fields, field order, and field attributes that are expected for the second row, wherein the first description and the second description are different;
generating a first task to process the first row based upon the first description of fields, field order, and field attributes; and
generating a second task, different than the first task, to process the second row based upon the second description of fields, field order, and field attributes;
for respective tasks within the task list:
generating task execution code for a task; and
executing the task execution code upon the non-uniform multi-row text file to generate result data for the task; and
responsive to processing the task list, generating parsed output data for the non-uniform multi-row text file based upon result data for the tasks.

2. The method of claim 1, the task comprising an object model storing task metadata that is dynamically transformable at runtime into the task execution code.

3. The method of claim 1, the executing the task execution code comprising:
executing a dynamically generated structure query language command based upon the task execution code.

4. The method of claim 1, the generating parsed output data comprising:
outputting the parsed output data into a staging area; and
exposing the staging area for client access.

5. The method of claim 1, the generating parsed output data comprising:
responsive to a data field within the non-uniform multi-row text file not corresponding to an expected data type, excluding the data field from the parsed output data.

6. The method of claim 1, the task corresponding to at least one of a user defined formula, calculation, constant, or conditional statement.

7. The method of claim 1, the task corresponding to a user mapping of an original value to a user predefined value.

8. The method of claim 1, the task corresponding to a procedure to perform a routine.

9. The method of claim 1, the task corresponding to a user mapping from a source field of the non-uniform multi-row text file to a destination field within a staging area within which the parsed output data is to be outputted.

10. The method of claim 1, the task corresponding to an extraction of data from the non-uniform multi-row text file for processing a subsequent non-uniform multi-row text file.

11. The method of claim 1, comprising:
receiving a set of non-uniform multi-row text files;
renaming the set of non-uniform multi-row text file based upon sources that provided the set of non-uniform multi-row text file, timestamp information, and file types to create a set of renamed non-uniform multi-row text files;
storing the set of renamed non-uniform multi-row text files within a network folder accessible to a load process;
initiating the load process to retrieve one or more renamed non-uniform multi-row text files from the network folder based upon a path-to-file parameter; and
for respective renamed non-uniform multi-row text files of the one or more renamed non-uniform multi-row text files:
identifying a target profile for a renamed non-uniform multi-row text file;
evaluating the target profile to generate a target task list;
for respective target tasks within the target task list:
generating target task execution code for a target task; and
executing the target task execution code upon the renamed non-uniform multi-row text file to generate target result data for the target task; and
responsive to processing the target task list, generating target parsed output data for the renamed non-uniform multi-row text file based upon target result data for the target tasks; and
loading the target parsed output data into a staging area for client access.

12. The method of claim 11, the path-to-file parameter comprising a wildcard character used for at least one of filtering or including renamed non-uniform multi-row text files.

13. The method of claim 11, comprising:
exposing the staging area for client access to parsed output data from a first renamed non-uniform multi-row text file and a second renamed non-uniform multi-row text file of the one or more renamed non-uniform multi-row text files.

14. A computing device comprising:
a memory containing machine readable medium comprising machine executable code having stored thereon instructions for performing a method of loading a non-uniform multi-row text file; and
a processor coupled to the memory, the processor configured to execute the machine executable code to cause the processor to:
receive a non-uniform multi-row text file comprising a first row with data formatted according to a first format and a second row with data formatted according to a second format different than the first format,
rename the non-uniform multi-row text file based upon a source that provided the non-uniform multi-row text file, timestamp information, and a file type to create a renamed non-uniform multi-row text file;
identify a profile for the non-uniform multi-row text file, the profile comprising metadata describing a set of tasks used to load a file type of the non-uniform multi-row text file, wherein the profile is selected from a set of profiles, used by a loading technique for processing record management service (RMS) format files, Latitude (AIM) format files, CACS format files, (NAN) format files, and YGC format files, based upon the first data format and the second data format;
evaluate the profile to generate a task list based upon the set of tasks, comprising:
parsing the profile to identify a first description of fields, field order, and field attributes that are expected for the first row and a second description of fields, field order, and field attributes that are expected for the second row, wherein the first description and the second description are different;

generating a first task to process the first row based upon the first description of fields, field order, and field attributes; and generating a second task, different than the first task, to process the second row based upon the second description of fields, field order, and field attributes;

for respective tasks within the task list:
  generate task execution code for a task; and
  execute the task execution code upon the non-uniform multi-row text file to generate result data for the task; and responsive to processing the task list, generate parsed output data for the non-uniform multi-row text file based upon result data for the tasks.

15. The computing device of claim 14, wherein tasks within the task list correspond to:
  a user defined formula;
  a user defined calculation;
  a user defined constant;
  a user defined conditional statement;
  a first user mapping of an original value to a user predefined value;
  a procedure to perform a routine;
  a second user mapping from a source field of the non-uniform multi-row text file to a destination field within a staging area within which the parsed output data is to be outputted; and
  an extraction of data from the non-uniform multi-row text file for processing a subsequent non-uniform multi-row text file.

16. The computing device of claim 14, wherein the machine executable code causes the processor to:
  output the parsed output data into a staging area; and
  expose the staging area for client access.

17. The computing device of claim 14, wherein the machine executable code causes the processor to:
  responsive to a data field within the non-uniform multi-row text file not corresponding to an expected data type, exclude the data field from the parsed output data.

18. The computing device of claim 14, wherein the machine executable code causes the processor to:
  execute a dynamically generated structure query language command based upon the task execution code.

19. A non-transitory machine readable medium having stored thereon instructions for performing a method comprising machine executable code which when executed by at least one machine, causes the machine to:
  receive a non-uniform multi-row text file comprising a first row with data formatted according to a first format and a second row with data formatted according to a second format different than the first format, rename the non-uniform multi-row text file based upon a source that provided the non-uniform multi-row text file, timestamp information, and a file type to create a renamed non-uniform multi-row text file;
  identify a profile for the non-uniform multi-row text file, the profile comprising metadata describing a set of tasks used to load a file type of the non-uniform multi-row text file, wherein the profile is selected from a set of profiles, used by a loading technique for processing record management service (RMS) format files, Latitude (AIM) format files, CACS format files, (NAN) format files, and YGC format files, based upon the first data format and the second data format;
  evaluate the profile to generate a task list based upon the set of tasks, comprising:
    parsing the profile to identify a first description of fields, field order, and field attributes that are expected for the first row and a second description of fields, field order, and field attributes that are expected for the second row, wherein the first description and the second description are different;
    generating a first task to process the first row based upon the first description of fields, field order, and field attributes; and
    generating a second task, different than the first task, to process the second row based upon the second description of fields, field order, and field attributes;
  for respective tasks within the task list:
  generate task execution code for a task; and
  execute the task execution code upon the non-uniform multi-row text file to generate result data for the task; and
  responsive to processing the task list, generate parsed output data for the non-uniform multi-row text file based upon result data for the tasks.

* * * * *